Sept. 10, 1957  O. E. HILL  2,805,526
GRINDING MACHINE — FEEDING MECHANISM
Filed Dec. 19, 1955
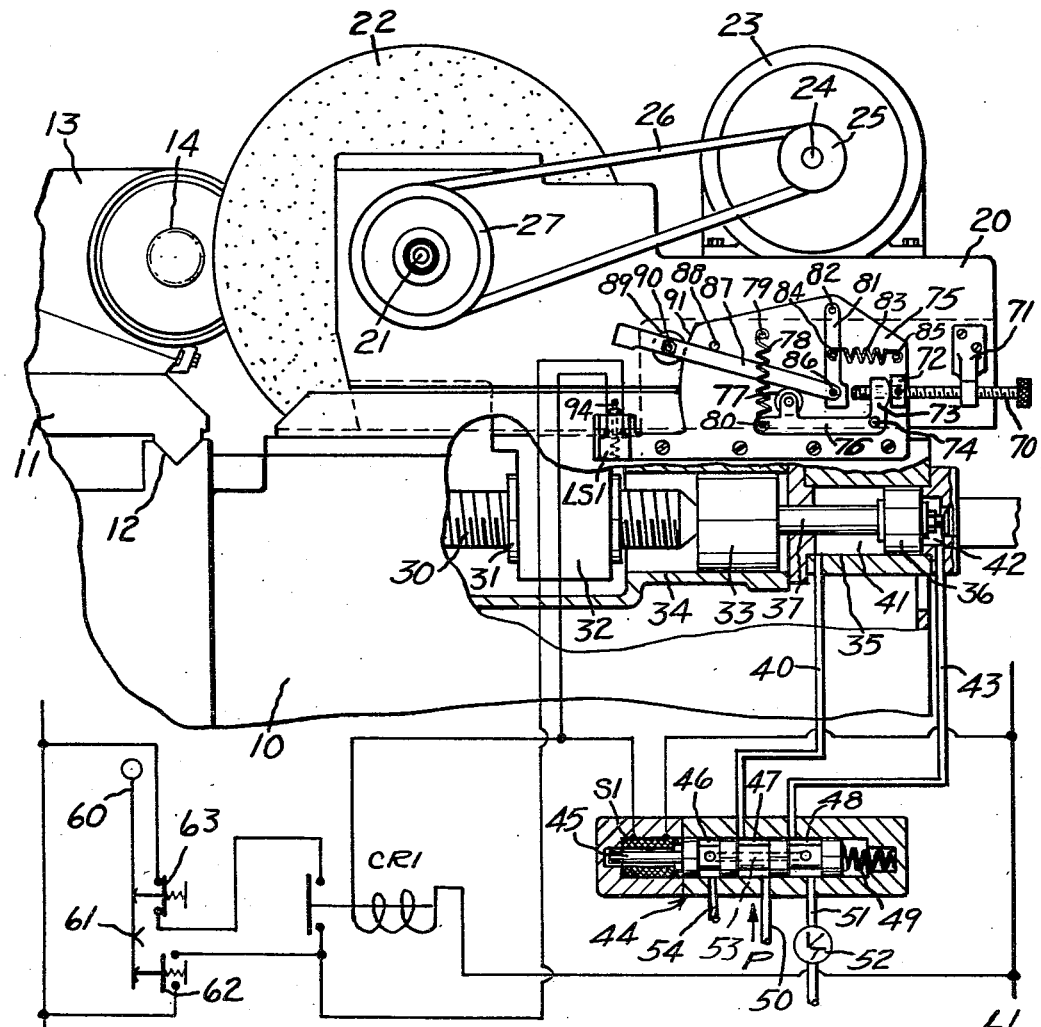
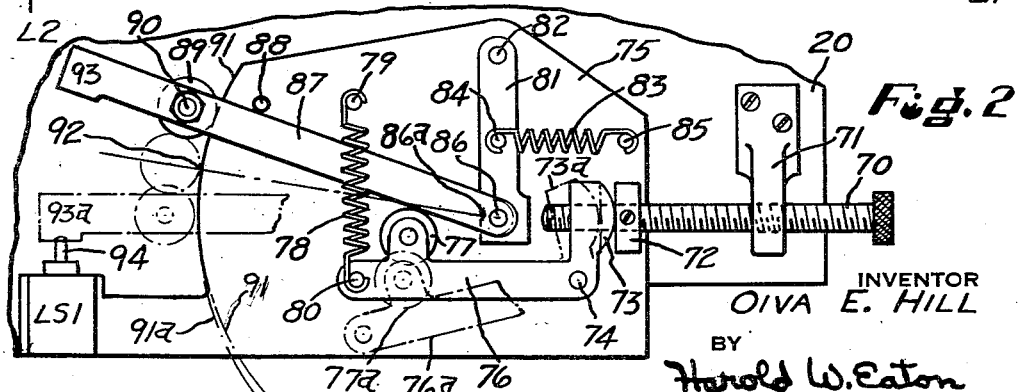
INVENTOR
OIVA E. HILL
BY
Harold W. Eaton
ATTORNEY

2,805,526

GRINDING MACHINE-FEEDING MECHANISM

Oiva E. Hill, West Boylston, Mass., assignor to Norton Company, Worcester, Mass., a corporation of Massachusetts Application December 19, 1955, Serial No. 553,769

5 Claims. (Cl. 51—165)

The invention relates to grinding machines, and more particularly to a work sizing control mechanism therefor.

One object of the invention is to provide a simple and thoroughly practical grinding machine work sizing control mechanism. Another object is to provide a sizing mechanism which is useful on a grinding machine, such as, a cam grinding or a centerless grinding machine where it is impractical to utilize a caliper-type mechanism.

Another object is to provide a cam-controlled lever mechanism actuated by and in timed relation with the infeeding movement of the wheel slide to terminate a grinding cycle when a work piece has been ground to a predetermined size. Another object is to provide a cam-controlled gravity actuated lever mechanism to cause a rapid rearward movement of the grinding wheel to an inoperative position when a work piece has been ground to a predetermined size.

Other objects will be in part obvious or in part pointed out hereinafter.

In the accompanying drawings, in which is shown one of various possible embodiments of the mechanical features of this invention, Fig. 1 shows a fragmentary end elevation of a grinding machine having parts broken away and shown in section to show the wheel feeding mechanism, combined with an electric and hydraulic diagram; and Fig. 2 is a fragmentary elevation, on an enlarged scale, of the size control mechanism.

A grinding machine has been illustrated in the drawings comprising a base 10 which supports a longitudinally movable work table 11 on a flatway (not shown) and a V-way 12 formed on the upper surface of the base 10. The table 11 supports a headstock 13 and a footstock (not shown) rotatably to support a work piece 14.

The base 10 also supports a transversely movable wheel slide 20 which is arranged to slide transversely relative to the base 10 on a flatway and a V-way (not shown) formed on the upper surface of the base 10. The wheel slide 20 supports a rotatable wheel spindle 21 in journalled bearings (not shown) mounted within the wheel slide 20, a grinding wheel 22 is mounted on one end of the wheel spindle 21.

A suitable driving mechanism is provided for the grinding wheel 20 comprising an electric motor 23 mounted on the upper surface of the wheel slide 20. The motor 23 is provided with a motor shaft 24 having a multiple V-groove pulley 25 which is connected by multiple V-belts 26 with a multiple V-groove pulley 27 mounted on the other end of the wheel spindle 21.

A feeding mechanism is provided for imparting a transverse feeding movement to the grinding wheel slide 20 comprising a rotatable feed screw 30. The feed screw 30 meshes with or engages a feed nut 31 which is carried by a bracket 32 depending from the underside of the wheel slide 20. The right hand end of the feed screw 30 is rotatably connected to a slidably mounted sleeve 33 which slides within a cylindrical aperture 34 formed in the base 10.

A hydraulically operated mechanism is provided for imparting an axial feeding movement to the feed screw 30. This mechanism may comprise a cylinder 35 which contains a slidably mounted piston 36. The piston 36 is connected to the right hand end of a piston rod 37, the left hand end of which is fixedly connected to the slidably mounted sleeve 33. When fluid under pressure is passed through a pipe 40 into a cylinder chamber 41, the piston 36 together with the sleeve 33, the feed screw 30, the wheel slide 20 and the grinding wheel 22 are moved rearwardly to an inoperative position, that is, toward the right into the position illustrated in the drawing. During this movement fluid within a cylinder chamber 42 may exhaust through a pipe 43.

A feed control valve 44 is provided for controlling the admission to and exhaust of fluid from the cylinder 35. The valve 44 is preferably a piston-type valve comprising a slidably mounted valve member 45 having a plurality of spaced valve pistons formed integrally therewith to form a plurality of valve chambers 46, 47 and 48. A compression spring 49 serves normally to maintain the valve member 45 in a left hand end position. A solenoid S1 is provided which when energized serves to shift the valve member toward the right to reverse the flow of fluid under pressure to the cylinder 35. In the position of the valve 44, as shown in the drawing, fluid under pressure from a suitable source is passed through a pressure pipe 50 into the valve chamber 47 and passes through the pipe 40 into the cylinder chamber 41 to move the piston 36 toward the right to move the wheel slide 20 and the grinding wheel 22 to a right hand rearward inoperative position. During this movement, fluid within the cylinder chamber 42 may exhaust through the pipe 43, into the valve chamber 48, through the central passage 53 into cylinder chamber 46 and exhaust substantially unrestricted through an exhaust pipe 54. Fluid exhausting through the valve chamber 48 may also exhaust through the pipe 51 and the throttle valve 52.

When the solenoid S1 is energized and the valve member 45 is shifted to a right hand end position, fluid from the pressure pipe 50 entering the valve chamber 47 passes through the pipe 43 into the cylinder chamber 42 to move the piston 36, the sleeve 33, the feed screw 30, the wheel slide 20 together with the grinding wheel 22 toward the left to move the grinding wheel 22 into operative engagement with the work piece 14 to be ground. During this movement, fluid within the cylinder chamber 41 may exhaust through the pipe 40, through the valve chamber 46, through a central passage 53 within the valve member 45, into the valve chamber 48 and pass out through exhaust pipe 51 and through the throttle valve 52 into the reservoir (not shown). It will be readily apparent from the foregoing disclosure that by manipulation of the throttle valve 52, the rate of movement of the wheel slide 20 in either direction may be readily controlled.

A cycle control lever 60 is pivotally mounted at 61 on the front of the machine base. The control lever 60 is arranged to actuate a normally open start switch 62 when the control lever is rocked in a counter-clockwise direction, and to open a normally closed stop switch 63 when control lever 60 is moved in a clockwise direction.

When it is desired to start a feeding cycle, the control lever 60 is rocked in a counter-clockwise direction to close the start switch 62 which closes a circuit through the normally closed limit switch LS1 to energize the relay switch CR1 and at the same time to energize the solenoid S1 so as to shift the valve member 45 into a right hand end position to start an infeeding movement of the wheel slide 20 and the grinding wheel 22. A holding circuit is set up through the normally closed limit switch LS1 to maintain the solenoid S1 energized during the infeeding movement of the grinding wheel, even though the start switch 62 is closed only momentarily.

In order to obtain the main object of the invention, a suitable work sizing control mechanism is provided for moving the wheel slide 20 rearwardly to an inoperative position after the slide has advanced to a predetermined position to grind a work piece to a predetermined size. This mechanism as illustrated in the drawing comprises a manually operable screw 70 which is supported by a bracket 71 fixedly mounted on the side of the wheel slide 20. The screw 70 is provided with an adjustably positioned collar 72 which may be clamped to the screw 70 by a set screw. The collar 72 is arranged to engage a vertically extending arm 73 when the wheel slide 20 moves forward, that is, toward the left. The arm 73 is one arm of a bell crank lever which is pivotally supported by a stud 74 carried by a plate 75 fixedly mounted on the side of the machine base 10. The bell crank lever is provided with a horizontally extending arm 76 which supports a roller 77. A tension spring 78 is connected between a stud 79 on the plate 75 and a stud 80 mounted on the horizontally extending arm 76. The spring serves to impart a force to the bell crank in a clockwise direction normally to maintain the roller 77 in engagement with the under side of a lever 87 to maintain the lever 87 in the position illustrated in Figs. 1 and 2.

A vertically arranged rock arm 81 is pivotally supported on a stud 82 carried by the plate 75. A tension spring 83 is connected between a stud 84 mounted on the arm 81 and a stud 85 mounted on the plate 75. The spring 83 tends to rock the arm 81 in a counter-clockwise direction. The arm 87 is pivotally supported at its right hand end by a stud 86 carried by the arm 81. A fixed stop stud 88 mounted on the plate 75 serves to limit the swinging movement of the lever 87 in a clockwise direction. The lever 87 is provided with a stud 90 which supports a rotatable follower roller 89. The follower roller 89 engages a cam face 91 formed on the plate 75. The tension of the spring 83 serves to maintain the follower roller 89 in operative engagement with the cam face 91. The spring 78 serves normally to maintain the roller 77 in operative engagement with the lower surface of the lever 87 normally to hold the lever 87 against the stud 88.

The cam face 91 is preferably formed as a circular surface having its center at 86a. This arc of cam 91 is of a shorter radius than the radius of the arc 91a so that the roller 89 is maintained in engagement with the cam face 91 until the roller reaches point 92. At this point the lever 87 has moved a sufficient distance toward the left so that roller 89 moves out of contact with the cam 91 and thereafter follows the arc 91a about the axis of stud 86 as a center. Normally the follower roller 89 and arm 87 are held in position as illustrated in Figs. 1 and 2 by the tension of the springs 78 and 83 respectively.

During the forward feeding movement of the wheel slide 20, the collar 72 moves into engagement with the vertical arm 73 and rocks the bell crank lever 73—76 and the roller 77 in a counter-clockwise direction against the tension of the spring 78 into broken line positions 73a, 76a and 77a (Fig. 2). This movement serves to shift the roller 77 to an inoperative position out of engagement with the lever 87.

After the roller 77 moves away from the lever 87, the tension of the spring 83 is sufficient to maintain the follower roller 89 in the position illustrated in Figs. 1 and 2. Continued movement of the wheel slide 20 toward the left causes the left hand end of the screw 70 to gradually move into engagement with the lower end of the rock arm 81 to produce a gradual swinging movement of the arm 81 in a clockwise direction. This movement shifts the lever 87 toward the left so that the roller 89 is free to roll down the cam face 91. When the follower roller 89 passes the point 92 on the cam face 91, the lever 87 is then free to swing rapidly in a counter-clockwise direction under the influence of gravity so that a relatively heavy hammer-like head portion 93 of the lever 87 moves rapidly into engagement with an actuating plunger 94 of the limit switch LS1 to open the switch LS1. Opening of limit switch LS1 serves to break the holding circuit for the relay switch CR1 and to deenergize the solenoid S1 so that the feed control valve member 45 shifts toward the left under the influence of the spring 49 into the position illustrated in the drawings. In this position of the valve, fluid under pressure is passed to the cylinder chamber 41 to move the piston 36 together with the wheel slide 20 and the grinding wheel 22 rapidly toward the right to move the grinding wheel 22 rearwardly to an inoperative position after the work piece has been ground to a predetermined size. During this latter movement of the arm 87, the roller 89 follows a circular path 91a having a center 86 (Fig. 2). At point 92 the follower roller 89 leaves the cam face 91 and follows the arc 91a.

During the rearward movement of the wheel slide 20, the bell crank lever 73—76 moves in a clockwise direction under the influence of the spring 78. During this movement, the roller 77 serves to cock or reset the mechanism for the next sizing operation. During the upward movement of the roller 77, the arm 87 is swung in a clockwise direction until it moves into engagement with the stop stud 88 in which position it remains under the influence of the springs 78 and 83.

In order to compensate for wheel wear either caused by grinding or wheel truing operations, a compensating adjustment may be made by manual adjustment of the screw 70 so that successive work pieces will be ground to the desired predetermined size.

The operation of this improved size control mechanism will be readily apparent from the foregoing disclosure. Assuming the mechanism to have been previously set up and adjusted for controlling the size of a work piece 14, the control lever 60 is manually rocked in a counter-clockwise direction to close the start switch 62 thereby energizing the relay switch CR1, setting up a holding circuit through the normally closed limit switch LS1 and at the same time energizing the solenoid S1 to shift the valve member 45 toward the right to admit fluid under pressure to the cylinder chamber 42 so as to move the piston 36, the wheel slide 20, and the grinding wheel 22 toward the left to grind a work piece 14 to a predetermined size. During the infeeding movement caused by the piston 36, the screw 70 rocks the bell crank lever 73—76 and thereafter engages and rocks the arm 81 to shift the lever 87 toward the left at a gradual rate of speed so that the follower roller 89 rides down the cam face 91 at a gradual rate of speed. When the roller 89 rides over the point 92 on the cam 91, the lever 87 together with the head 93 swings rapidly in a counter-clockwise direction to open the limit switch LS1 thereby breaking the holding circuit to deenergize relay switch CR1 and also to deenergize the solenoid S1 so as to cause a rapid rearward movement of the wheel slide 20 when the work piece has been ground to a predetermined size. During this rearward movement of the wheel slide 20 to an inoperative position, the sizing mechanism is automatically cocked ready for the next cycle. As the screw 70 moves toward the right the released tension of the spring 78 causes the bell crank lever 73—76 to swing in a clockwise direction to shift the lever 87 together with the follower roller 89 into its initial position thereby resetting or cocking the sizing mechanism for the next grinding cycle.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a base, a rotatable work support thereon, a transversely movable slide on said base, a rotatable grinding wheel thereon, a fluid motor to move said slide in either direction, a control valve therefor, means including a switch to actuate said valve to initiate a grinding cycle, means including a limit switch operatively connected to actuate said valve to terminate a grinding cycle, a cam controlled lever mechanism to actuate said limit switch, and means actuated by and in timed relation with the infeeding movement of said slide to actuate said lever mechanism to actuate said limit switch automatically to cause a movement of the slide to an inoperative position so as to terminate the grinding cycle when the slide has advanced to a predetermined extent.

2. In a grinding machine, as claimed in claim 1, in combination with the parts and features therein specified in which said cam controlled lever mechanism comprises a fixedly mounted cam, a pivotally mounted lever, a follower roller thereon, means to maintain said follower roller in operative engagement with said cam, and means including an adjustable mounted screw on said slide to actuate said lever mechanism to operate said limit switch to terminate the grinding cycle when the work piece has been ground to a predetermined extent.

3. In a grinding machine, as claimed in claim 1, in combination with the parts and features therein specified in which said lever mechanism includes a pivotally mounted hammer-type lever to actuate said limit switch, a rotatable follower roller thereon and a cam fixedly mounted on said base to control movement of said lever, a pivotally mounted bell crank lever, a roller on one arm of said bell crank lever normally to hold said pivotally mounted lever in an inoperative position, and means including an actuating screw mounted on said wheel slide to actuate said bell crank lever to swing said roller away from said lever and thereafter to move said lever longitudinally so that the follower roller rides down the cam face until the lever is free to swing rapidly under the influence of gravity to actuate said limit switch so as to terminate a grinding cycle when the work piece has been ground to a predetermined extent.

4. In a grinding machine having a base, a rotatable work support thereon, a transversely movable slide on said base, a rotatable grinding wheel thereon, a fluid motor to move said slide in either direction, a control valve therefor, means including a switch to actuate said valve to initiate a grinding cycle, means including a limit switch operatively connected to actuate said valve to terminate a grinding cycle, a normally inoperative cam control lever mechanism to actuate said limit switch, means actuated by and in timed relation with the infeeding movement of said slide to actuate said lever mechanism automatically to move said slide to an inoperative position so as to terminate a grinding cycle when the slide has reached to a predetermined position, and means including a lever actuated by and in timed relation with the movement of the said slide to an inoperative position to reset said lever mechanism for the next grinding cycle.

5. In a grinding machine having a base, a rotatable work support thereon, a transversely movable slide on said base, a rotatable grinding wheel thereon, a fluid motor to move said slide in either direction, a control valve therefor, means including a switch to actuate said valve to initiate a grinding cycle, means including a limit switch operatively connected to actuate said valve to terminate a grinding cycle, a cam control lever mechanism to actuate said limit switch, means including a bell crank lever operatively connected normally to hold said lever mechanism in an inoperative position, and means actuated by and in timed relation with the infeeding movement of said slide to move said bell crank lever to an inoperative position thereby rendering said lever mechanism operative to terminate the grinding cycle when a work piece has been ground to a predetermined extent, said bell crank lever serving during movement of the slide to an inoperative position to reset said lever mechanism for the next grinding cycle.

References Cited in the file of this patent

UNITED STATES PATENTS

| | | |
|---|---|---|
| 1,920,228 | Wood | Aug. 1, 1933 |
| 2,448,874 | Flygare et al. | Sept. 7, 1948 |